(12) United States Patent
Kowalchuk

(10) Patent No.: US 8,220,235 B2
(45) Date of Patent: Jul. 17, 2012

(54) CORN HEAD STRIPPER PLATE ADJUSTING MECHANISM

(75) Inventor: Trevor Kowalchuk, Saskatoon (CA)

(73) Assignee: CNH America LLC, New Holland, PA (US)

( * ) Notice: Subject to any disclaimer, the term of this patent is extended or adjusted under 35 U.S.C. 154(b) by 255 days.

(21) Appl. No.: 12/689,659

(22) Filed: Jan. 19, 2010

(65) Prior Publication Data

US 2011/0173942 A1 Jul. 21, 2011

(51) Int. Cl.
A01D 45/02 (2006.01)
A01D 45/10 (2006.01)

(52) U.S. Cl. .......................................................... 56/62
(58) Field of Classification Search .................... 56/113, 56/62, 104, 119, 64, 105
See application file for complete search history.

(56) References Cited

U.S. PATENT DOCUMENTS

| | | | |
|---|---|---|---|
| 2,604,749 A * | 7/1952 | Fergason | 56/103 |
| 2,618,113 A | 11/1952 | Hyman | |
| 3,101,579 A * | 8/1963 | Karlsson et al. | 56/105 |
| 3,126,690 A * | 3/1964 | Keller et al. | 56/107 |
| 3,262,255 A * | 7/1966 | Karlsson et al. | 56/107 |
| 3,271,940 A * | 9/1966 | Ashton et al. | 56/105 |
| 3,496,708 A | 2/1970 | Bornzin | |
| 3,552,398 A | 1/1971 | Looker et al. | |
| RE27,554 E * | 1/1973 | Ashton et al. | 56/105 |
| 3,707,833 A * | 1/1973 | Sutton | 56/104 |
| 3,858,384 A * | 1/1975 | Maiste et al. | 56/14.2 |
| 3,940,913 A * | 3/1976 | Wallenfang et al. | 56/98 |
| 4,086,749 A | 5/1978 | Greiner et al. | |
| RE31,064 E * | 10/1982 | Shriver | 56/98 |
| 4,531,351 A | 7/1985 | Sousek | |
| 5,060,464 A | 10/1991 | Caron | |
| 5,680,750 A | 10/1997 | Stefl | |
| 5,878,559 A | 3/1999 | Cooksey et al. | |
| 5,961,573 A | 10/1999 | Hale et al. | |
| 6,205,384 B1 | 3/2001 | Diekhans | |
| 6,226,969 B1 * | 5/2001 | Becker | 56/62 |
| 6,237,312 B1 | 5/2001 | Becker | |
| 6,237,314 B1 | 5/2001 | Boll | |
| 6,681,551 B1 | 1/2004 | Sheidler et al. | |
| 6,871,483 B1 | 3/2005 | Panoushek | |
| 2001/0016794 A1 | 8/2001 | Falck et al. | |
| 2005/0150202 A1 | 7/2005 | Quick | |
| 2011/0146218 A1 * | 6/2011 | Carboni | 56/62 |

* cited by examiner

Primary Examiner — Arpad Fabian-Kovacs

(74) Attorney, Agent, or Firm — Michael G. Harms

(57) ABSTRACT

A cornhead row unit is provided including first and second longitudinally extending stripper plates mounted on a frame and having opposed stripping edges which define a gap between them. The frame further includes a resilient device arranged and disposed to adjustably transversely urge the first stripper plate on the frame toward the second stripper plate to vary the width of the gap. An adjusting arrangement connecting the frame and the second stripper plate selectably and transversely moves the second stripper plate with respect to the first stripper plate to vary the width of the gap.

17 Claims, 6 Drawing Sheets

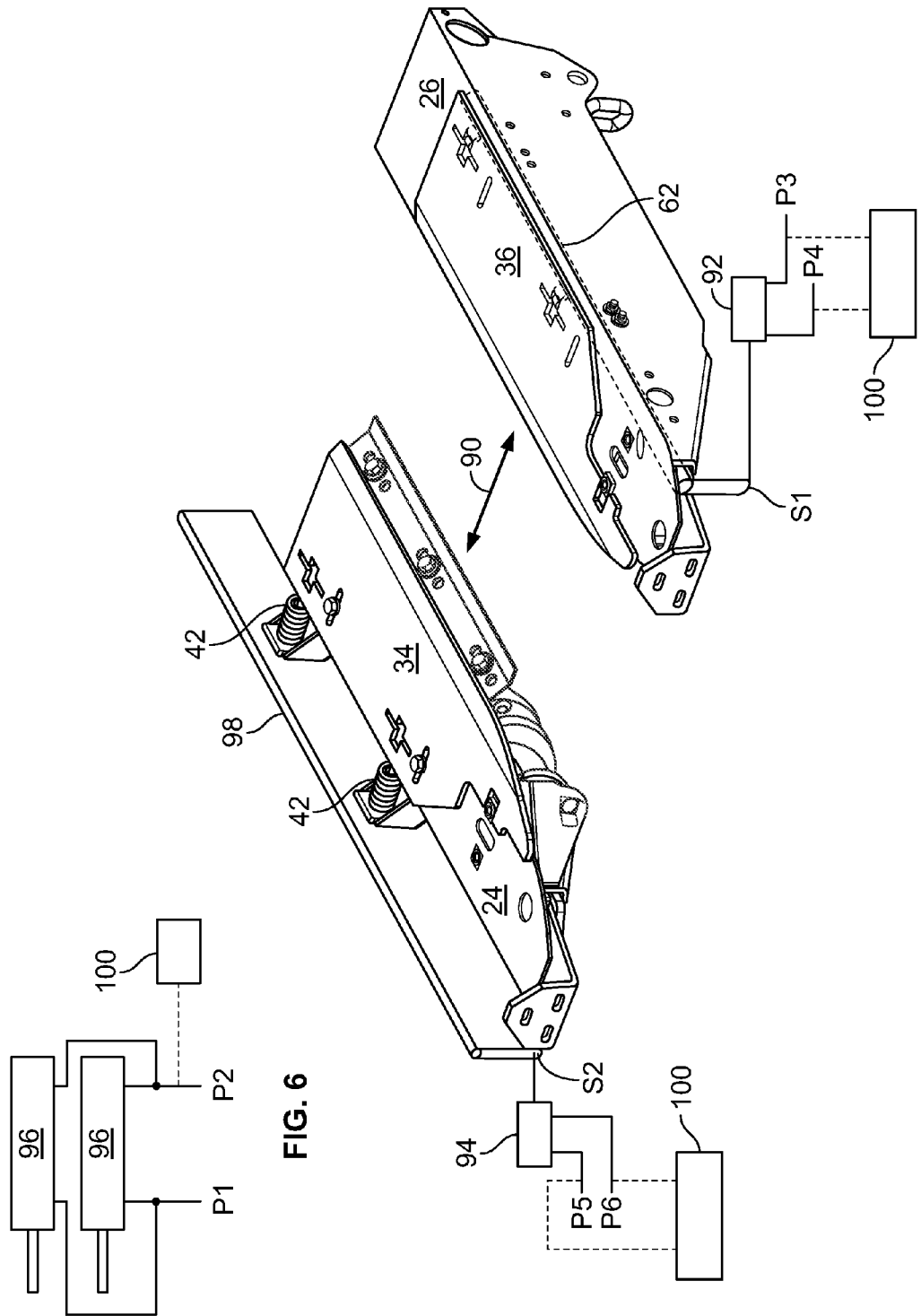

CORN HEAD STRIPPER PLATE ADJUSTING MECHANISM

FIELD OF THE INVENTION

The invention relates in general to agricultural combines. It relates particularly to a corn harvesting header assembly for use with an agricultural combine.

BACKGROUND OF THE INVENTION

A corn harvesting header assembly or cornhead for an agricultural combine typically comprises a series of row units which are identical to each other. Each row unit includes a pair of snapping rolls having a snapping slot formed between them. Gathering chains having gathering fingers guide corn stalks into the snapping slot. The snapping rolls pull the corn stalks through the snapping slot and the ears are removed from the stalks as they come into engagement with opposed edges of stripper plates which bracket the slot between the gathering chains and the snapping rolls.

It is conventional for at least one of the two stripper plates to be mounted on the row unit frame for movement toward and away from the other plate. This movement permits the gap between the opposed stripping edges to be varied to accommodate different corn crops and crop conditions. Adjustment of the gap is typically accomplished by an adjusting mechanism including an actuation lever coupled to the adjustable stripper plate.

Coupling arrangements in use today vary, but typically, a tradeoff is made between part cost and durability. Durable or rugged designs normally result in increased part costs, but also provide increased service life. An example of a rugged actuation lever coupling arrangement presently in use is found in a corn harvesting header assembly produced by Deere & Company. In the Deere construction, a longitudinally extending rod is welded to the underside of the adjustable stripper plate. A forked end on the actuation lever cooperates with the rod in a lost motion relationship while maintaining line contact to smoothly move the adjustable stripper plate transversely and, accordingly, vary the gap between opposed stripping edges of the stripper plates.

Whether insufficiently rugged or too expensive, actuation lever adjusting mechanism and coupling arrangements in use today do not completely satisfy the customer—the farm operator. The mechanism of the present invention was developed to provide the farm operator with a rugged, yet simple and inexpensive solution.

Other features and advantages of the present invention will be apparent from the following more detailed description of the preferred embodiment, taken in conjunction with the accompanying drawings which illustrate, by way of example, the principles of the invention.

SUMMARY OF THE INVENTION

The present invention relates to a cornhead row unit including first and second longitudinally extending stripper plates mounted on a frame and having opposed stripping edges which define a gap between them. The frame further includes a resilient device arranged and disposed to adjustably transversely urge the first stripper plate on the frame toward the second stripper plate to vary the width of the gap. A fluid ram connecting the frame and the second stripper plate selectably and transversely moves the second stripper plate with respect to the first stripper plate to vary the width of the gap.

The present invention further relates to a cornhead row unit including first and second longitudinally extending stripper plates mounted on a frame and having opposed stripping edges which define a gap between them. The frame further includes a resilient device arranged and disposed to adjustably transversely urge the first stripper plate on the frame toward the second stripper plate to vary the width of the gap. A fluid ram is connected to the frame. A mechanical device is connected between the fluid ram and the second stripper plate, so that in response to selective movement of the fluid ram with respect to the mechanical device, the mechanical device transversely moves the second stripper plate with respect to the first stripper plate to vary the width of the gap.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 6 is a schematic of a portion of a hydraulic system of an agricultural combine mounting a corn harvesting header assembly of the present invention.

FIG. 7 is a schematic of a portion of a hydraulic system of a corn row unit of the present invention.

Wherever possible, the same reference numbers will be used throughout the drawings to refer to the same or like parts.

DETAILED DESCRIPTION OF THE INVENTION

Figure 1:
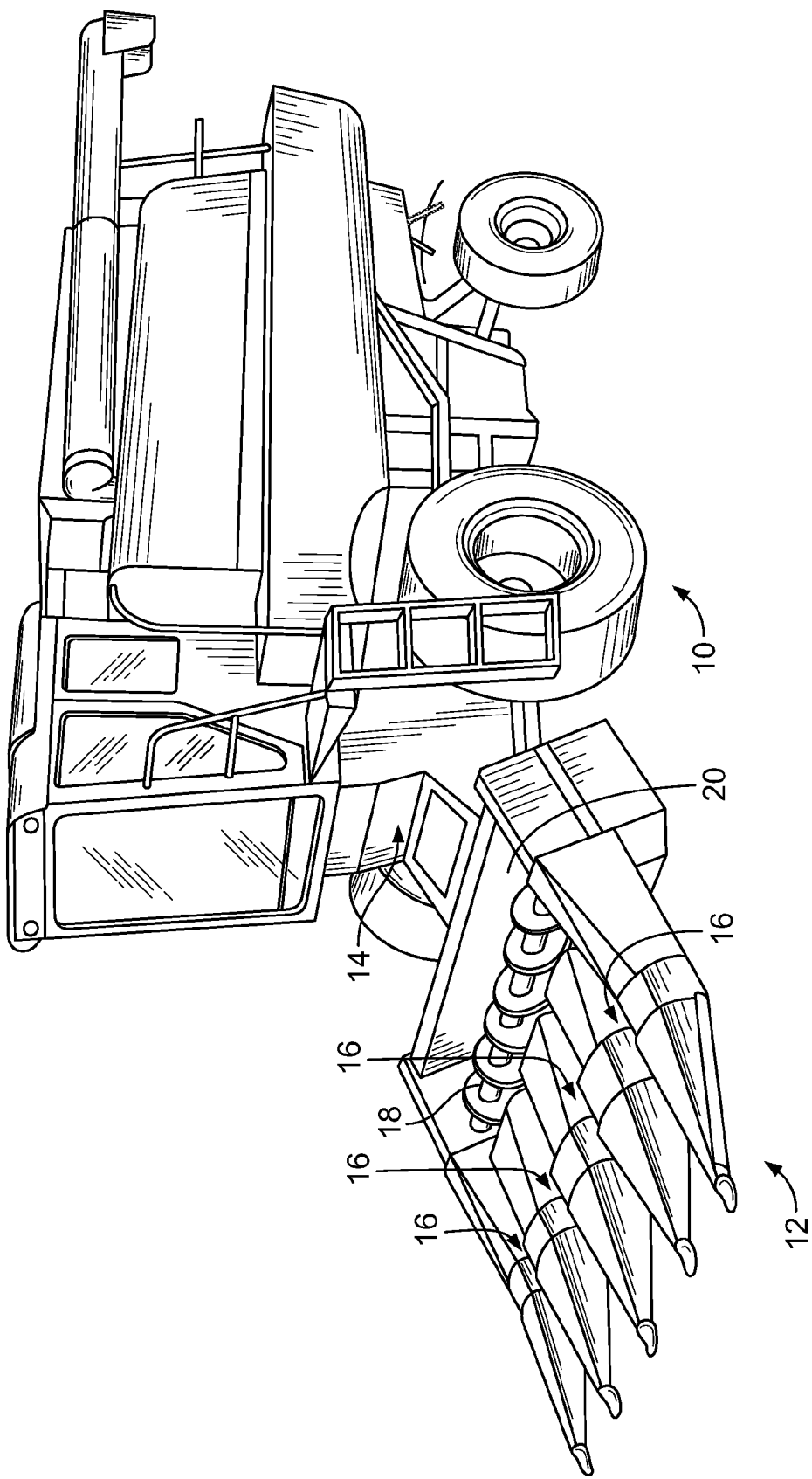
FIG. 1 is a front-side perspective view of an agricultural combine mounting a corn harvesting header assembly.

Referring now to the drawings, and particularly to FIG. 1, an agricultural combine of generally conventional construction is seen at 10. A corn harvesting header assembly, header assembly or cornhead 12 is mounted on combine 10, cantilevered in front of combine 10 and connected to the combine by a feeder assembly 14.

Header assembly 12 illustrated contains four row units 16, which harvest four rows of corn simultaneously. In other embodiments, the number of rows of corn that may be harvested may be different than four. Ears of corn are stripped from each of the four rows by a row unit 16 and then carried by an auger 18 in a trough 20 of a header assembly 12 to a feeder assembly 14. Feeder assembly 14 carries the collected ears rearwardly and upwardly into a threshing assembly (not shown) in the body of combine 10.

Figure 2:
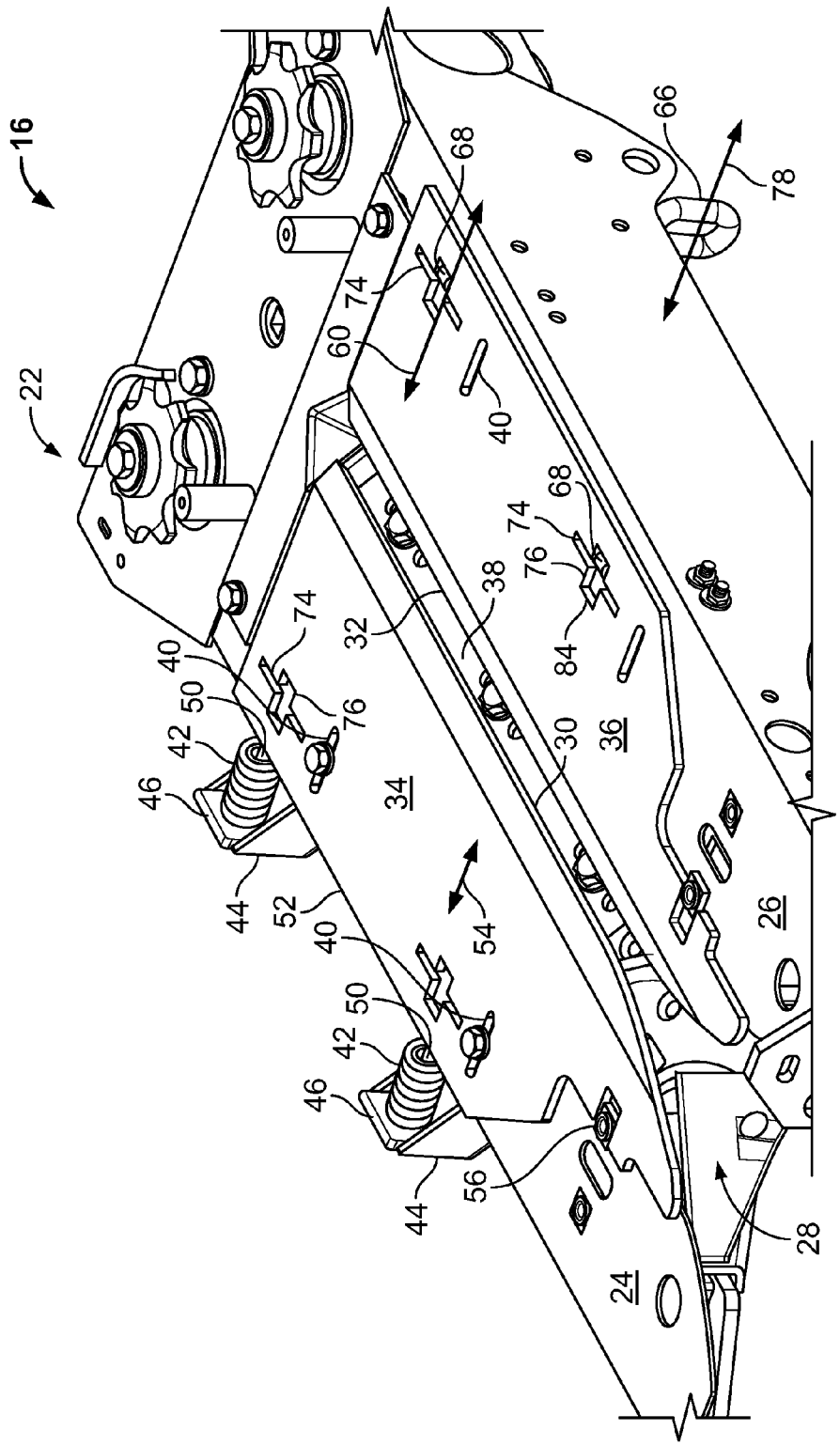
FIG. 2 is a top-front-side perspective view of a row unit in the corn harvesting header assembly of FIG. 1, the row unit incorporating a stripper plate adjustment mechanism embodying features of the present invention.
Figure 3:
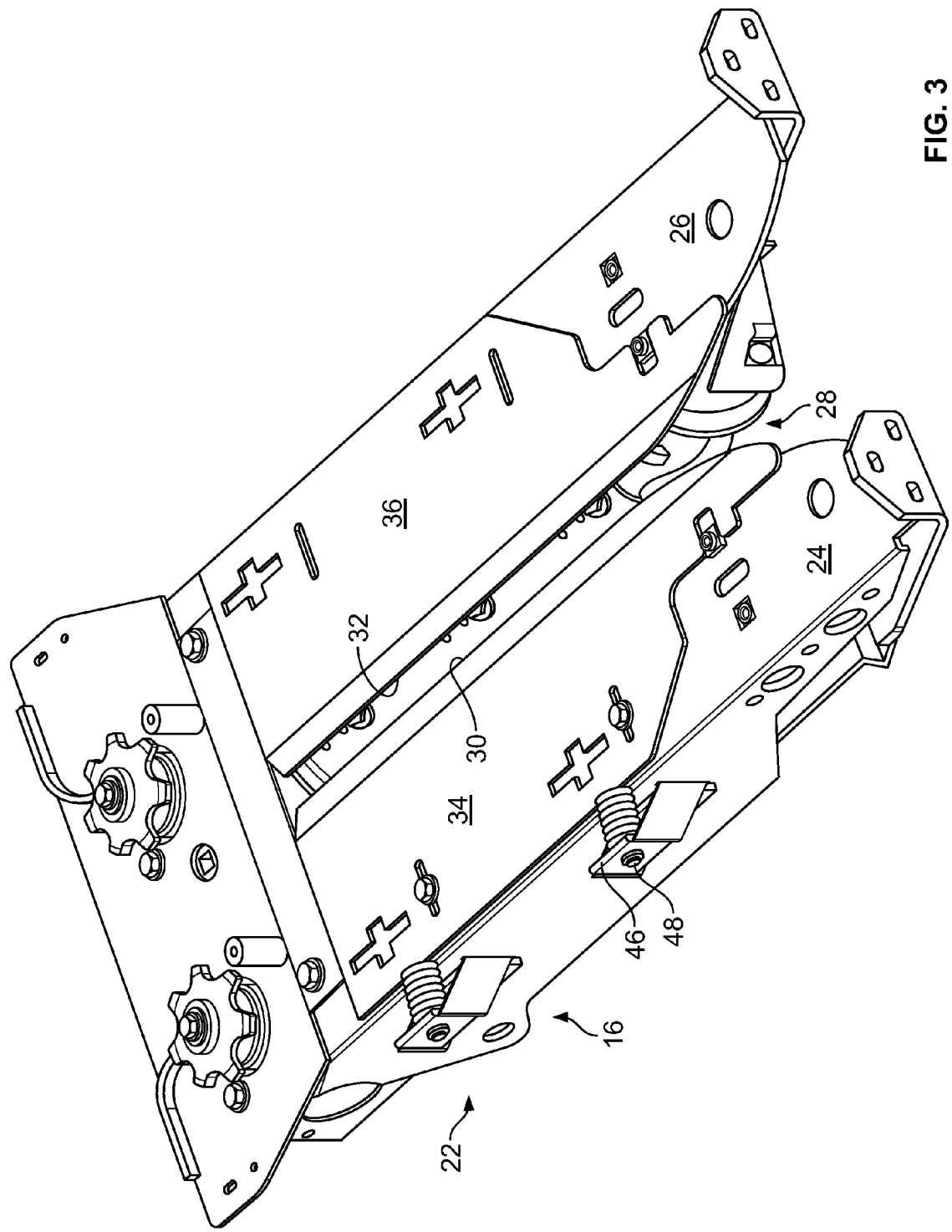
FIG. 3 is a reverse top-front-side perspective view of a row unit in the corn harvesting header assembly of FIG. 2 of the present invention.

Referring now also to FIGS. 2 and 3, a row unit 16 is shown removed from header assembly 12. Row unit 16 gathers corn stalks as the row unit moves forwardly along a row of corn.

Each row unit 16 includes a U-shaped frame 22 having legs 24, 26 on which each leg 24, 26 a gathering chain assembly (not shown) is mounted for endless circulation in paths parallel to each other. See U.S. Pat. No. 6,237,342, filed Sep. 19, 2002 (Becker), which is incorporated by reference in its entirety. The gathering chain assemblies each of which includes a series of gathering fingers (not shown) are designed to draw the stalks into a gap 28 defined between opposed edges 30, 32 of plates or stripper plates 34, 36, respectively. Snapping rolls 38 (FIG. 4) beneath stripper plates 34, 36 pull the corn stalks downwardly through gap 28 and the ears of corn are stripped off of the stalks by plates edges 30, 32 as the stalks are pulled downwardly between them.

The gathering fingers of the gathering chain assembly (not shown) carry the stripped ears of corn rearwardly into to trough 20. There the ears of corn are deposited and conveyed by auger 18 to feeder assembly 14. The stripped corn stalks are pulled through row unit 16 as feeder assembly 14 moves on through the field, with the stalks being left in the field.

In an exemplary embodiment, stripper plates 34, 36 are of substantially identical construction. Their opposed edged 30, 32, respectively, define gap 28. Stripper plate 34 is bolted through slots 40 in leg 24 of U-shaped frame 22. The bolted or otherwise mechanically fastened connections through respective slots 40 of plate 34 permit plate 34 to move in a substantially transverse direction to leg 24, such as in a direction 54. Edge 30 of plate 34 is urged toward edge 32 of plate 36 by resilient devices 42, such as springs. Resilient devices 42 are each retained in position by a frame 44 extending outward from a sidewall of leg 24. In one embodiment, frame 44 includes an end cap 46 through which an elongated member 48, such as a bolt or screw, the head of which member 48 is shown in FIG. 3 to help retain resilient device 42 in an installed position. In addition, respective tabs 50 may extend from an edge 52 facing in a direction that is opposite of edge 30, which tabs 50 further aiding in securing resilient device 42 in its installed position. To provide further control of transverse travel direction 54 of plate 34, in addition to the bolted connections through slots 40, a protrusion 56 may be aligned with a slotted opening 58 formed in plate 34. In an exemplary embodiment, protrusion 56 includes parallel opposed surfaces such as a square head of a mechanical fastener that corresponds to similarly parallel opposed surfaces of slotted opening 58.

Movement of plate 34 in transverse direction 54 may result in response to forces applied to resilient devices 42, which movement toward edge 32 resulting when the combined forces of resilient devices 42 are greater than friction and/or forces opposing retention forces generated by resilient devices 42. Alternately, movement of plate 34 away from edge 32 results when the combined retention forces of resilient devices 42 and friction are less than forces opposing the retention forces generated by resilient devices 42.

Figure 5:
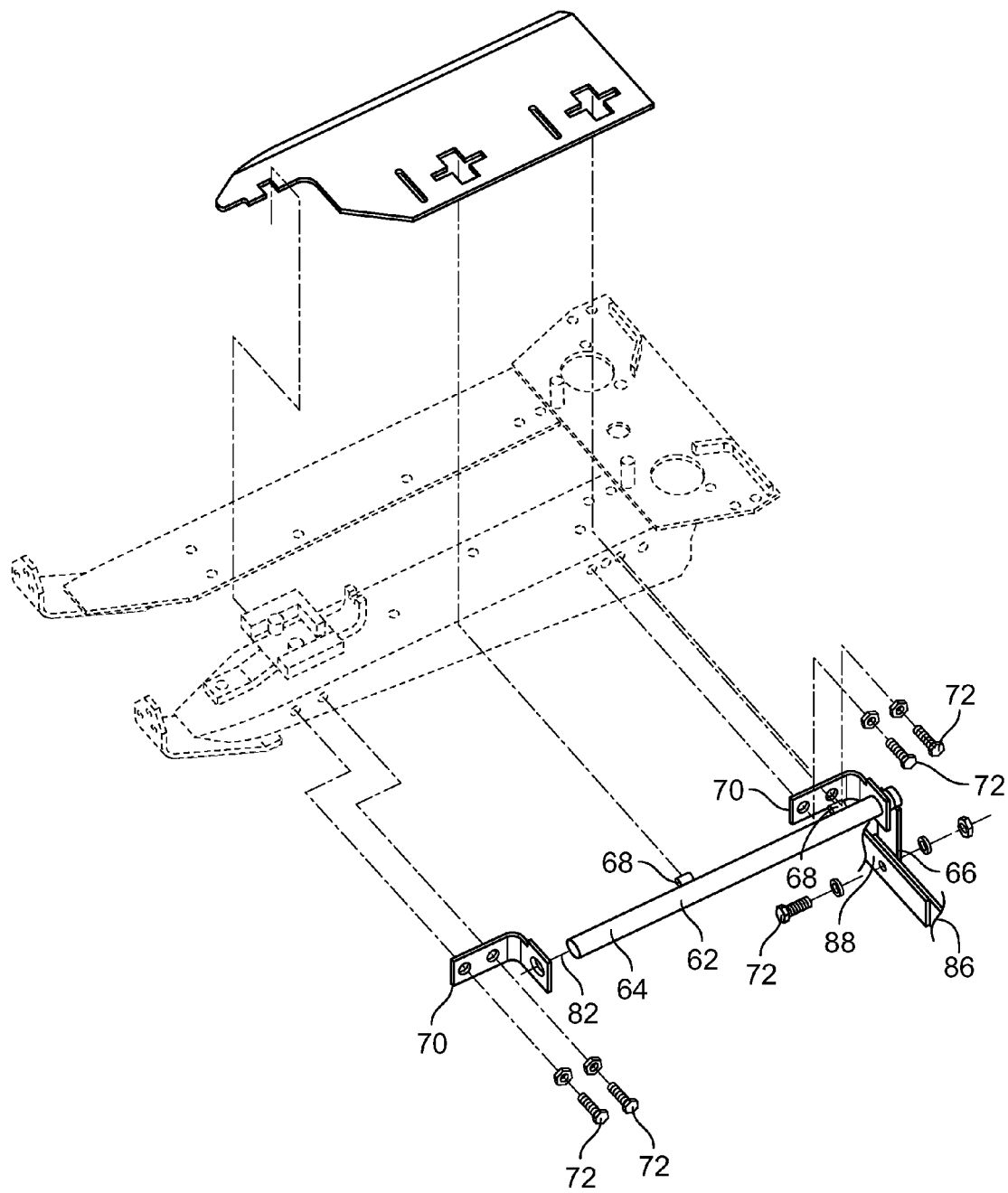
FIG. 5 is an exploded top-front-side perspective view of a row unit in the corn harvesting header assembly of FIG. 2 of the present invention.

Movement of plate 36 in a transverse direction 60 is now discussed. Referring to FIG. 5, a mechanical device 62, such as a mechanical linkage includes a shaft 64 that is secured to an arm 66. At least one protrusion 68, and as shown in FIG. 5, a pair of protrusions 68, outwardly extend from shaft 64. Protrusion 68 may be welded or otherwise bonded to shaft 64 or may be of unitary construction in an alternate embodiment. As further shown in FIG. 5, a pair of brackets 70 are secured to leg 26, such as by mechanical fasteners 72 to permit rotation of shaft 64 about a longitudinal axis 82 (i.e., perpendicular to transverse direction 60) of mechanical device 62 to leg 26. In an alternate embodiment, brackets 70 could be welded, adhered or otherwise affixed to leg 26 by other methods or techniques. When mechanical device 62 is assembled to leg 26, protrusions 68 are aligned with cross-shaped opening 74. More specifically, protrusions 68 are aligned with the transversely extending portions 76 of opening 74, which provides a longitudinal retention feature of mechanical device 62. That is, protrusions 68 extending through transversely extending portions 76 of opening 74 prevent movement of mechanical device 62 along axis 82.

Figure 4:
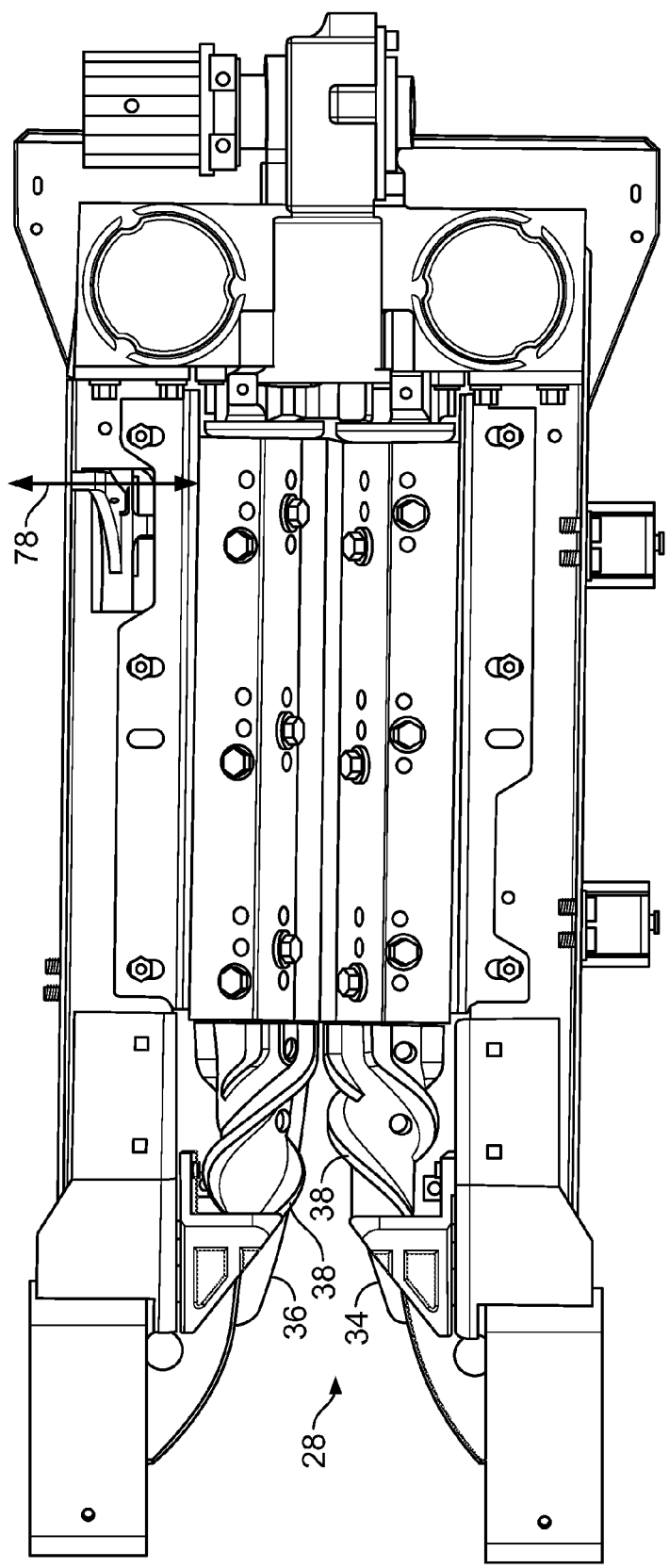
FIG. 4 is a bottom view of the row unit of FIG. 2 of the present invention.

To bring about movement of plate 36 in transverse direction 60, an end of arm 66 opposite shaft 64 is moved in a transverse direction 78 (see FIGS. 2 and 4). In response to this transverse movement, shaft 64 rotates about its longitudinal axis 82, similarly rotating protrusions 68 about axis 82. Protrusions 68 and transversely extending portions 76 of corresponding openings 74 are sized such that in response to a predetermined movement of arm 66 in one direction 78, resulting in a similarly predetermined angular rotation of shaft 64 about axis 82, protrusions 68 are brought into contact with the ends 84 of transversely extending portions 76. Further movement of arms 66 in the same direction 78 results in movement of plate 36 in transverse direction 60 in the opposite sense as that of arm 66. To bring about movement of plate 36 in the opposite transverse direction 60, the end of arm 66 opposite shaft 64 is moved in a transverse direction 78 that is opposite that previously applied, until protrusions 68 are brought into contact with the opposed ends 84 of the opposed transversely extending portions 76, with further movement of arm 66 in that direction resulting in movement of plate 36 in the opposite sense as that of arm 66. That is, a transverse direction correlates to right or left movement, sufficient movement of arm 66 in direction 78 to the left results in movement of plate 36 in direction 60 to the right, and vice versa.

As further shown in FIG. 5, an end 86 of an adjusting arrangement, such as a fluid ram (not shown) may be secured by fasteners 72 to arm 66 of mechanical device 64 to bring about transverse movement of plate 36. Optionally, a linkage 88 may be utilized to interconnect arms 66 of adjacent row units so that movement of end 86 of the fluid ram would simultaneously result in transverse movement of each corresponding plate 36 of each head row unit. It is to be understood that the fluid ram may be in fluid communication with a fluid system operating at an adjustable pressure level that is capable of providing a range of forces as required by the field conditions. In one embodiment the fluid system pressure level may be controlled remotely from plates 34, 36, such as the combine cab, for convenience of the operator.

It is to be understood that in an alternate embodiment, an adjusting arrangement includes an electrical linear actuator. In a further embodiment, an adjusting arrangement includes transversely oriented slots configured and disposed with mechanical fasteners, permitting selective and transverse movement to be performed manually. However, the term powered adjusting arrangement is intended to refer to devices or systems that do not involve manual adjustment, such as a fluid ram or electrical linear actuator or the like.

FIGS. 6-7 schematically show different portions of a hydraulic system usable in an exemplary embodiment to control spacing between stripper plates 34, 36 of the present invention. For example, fluid ram 94 may be utilized to increase adjustability of resilient devices 42 or springs of fixed length associated with transverse movement 90 of stripper plate 34. That is, fluid ram 94 may selectively move a support member 98, acting as an adjustable end cap 46 (FIG. 2). Fluid pressure P5 applied to fluid ram 94 urges support member 98 toward stripper plate 34, while fluid pressure P6 applied to fluid ram 94 urges support member 98 away from stripper plate 34. A position sensor S2 may be used to monitor the position of support member 98.

As further shown in FIG. 7, fluid ram 92 may be utilized to bring about transverse movement 90 of stripper plate 36. That is, fluid ram 92 selectively moves a mechanical device 62, utilizing fluid pressure P4 applied to fluid ram 92 to rotatably urge stripper plate 36 toward stripper plate 34, while fluid pressure P3 is applied to fluid ram 92 to rotatably urge stripper plate 36 away from stripper plate 34. A position sensor S1 is used to monitor the position of mechanical device 62.

FIG. 6 shows a pair of fluid rams 96 connected in parallel with the fluid pressure P2 that is used to lift a header, which includes cornhead 12 (FIG. 1), while fluid pressure P1 is used to lower the header.

Components described in FIGS. 6-7, in which each fluid pressure P1-P5 includes a pressure sensor (not shown, but similarly designated respectively as P1-P5) may be associated with a controller 100 to effectively control the gap between stripper plates 34, 36 during corn harvesting, including conditions in which the cornhead is not in the harvesting contact with a corn row. Such conditions occur when the combine has completed harvesting of a corn row and is turning around, typically referred to as a "headland turn", to resume harvesting of the adjacent and previously unharvested corn row. During execution of a headland turn, if the transverse force associated with resilient devices 42 or springs is excessive, due to the gap between stripper plates 34, 36 being too close to each other, upon resumption of harvesting in the subsequent corn row, sometimes referred to as "re-entry into the crop", the cornstalks of the initially encountered corn row may not slide between the facing edges of stripper plates 34, 36, causing the cornstalks to "lay over", forcing the operator to reduce combine speed, until an adjustment of the gap between the stripper plates occurs.

In one embodiment, the adjusting arrangement, such as fluid ram 92, and pressure sensor P4 is associated with controller 100 and stripper plate 36. In response to a pressure sensed by pressure sensor P3 being less than a first predetermined pressure, controller 100 selectably controls the adjusting arrangement, such as fluid ram 92, until the pressure sensed by the pressure sensor P3 is between a first predetermined range that is at least equal to the first predetermined pressure. Such an arrangement maintains a minimum force that is applied by stripper plate 36 to a corn row being harvested.

In another embodiment, the adjusting arrangement, such as fluid ram 92, and pressure sensor P3 is associated with controller 100 and stripper plate 36. In response to a pressure sensed by pressure sensor P3 being greater than a second predetermined pressure, controller 100 selectably controls the adjusting arrangement, such as fluid ram 92, until the pressure sensed by the pressure sensor P3 is between a second predetermined range that is less than the second predetermined pressure. Such an arrangement limits a maximum force that is applied by stripper plate 36 to a corn row being harvested.

In a further embodiment, a lifting device associated with controlling a vertical position of the corn head row unit, such as fluid rams 96, is a communication with controller 100. In response to an operating parameter associated with a lifting device corresponding to a condition in which the corn head row unit is not in harvesting contact with a corn row, such as a headland turn, controller 100 selectably controls the adjusting arrangement, such as fluid ram 92, to move stripper plate 36 to a predetermined gap from stripper plate 34. Such operating parameters may include an increase in pressure level of P2 applied to fluid rams 96. Alternately, the operating parameter corresponds to a decrease in pressure sensor P3 or P5, either or both of which may be connected in parallel with controller 100, at least in a figurative sense, since any of the operating parameters may be an indicator of a headland turn.

Alternately, controller may be configured to maintain a predetermined gap for a predetermined time. Such a predetermined time would correspond to the time normally associated with executing a headland turn, to avoid the laying over of corn stalks of the re-entry corn row described above.

In yet a further embodiment, due to a variance in time associated with executing a headland turn, controller 100 may be configured to discontinue maintaining a predetermined gap between stripper plates 34, 36 prior to expiration of the predetermined time (i.e., the time normally associated with executing a headland turn), in response to a sufficient increase in the pressure sensed by a pressure sensor, such as pressure sensor P3 or P5, indicative of completion of the headland turn and re-entry into the adjacent corn row.

It is to be understood that other conditions such as flow rate, may also be measured and included as an operating parameter as indicative of a headland turn. For example, an increase in flow to the portion of the hydraulic circuit associated with P2 may be indicative of a headland turn.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A cornhead row unit comprising:
   first and second longitudinally extending stripper plates mounted on a frame and having opposed stripping edges which define a gap between them;
   the frame further comprising:
   a resilient device arranged and disposed to adjustably transversely urge the first stripper plate on the frame toward the second stripper plate to vary the width of the gap; and
   an adjusting arrangement connecting the frame and the second stripper plate to selectably and transversely move the second stripper plate with respect to the first stripper plate to vary the width of the gap, wherein the adjusting arrangement further comprises a pressure sensor associated with a controller and the second stripper plate, wherein in response to a pressure sensed by the pressure sensor being less than a first predetermined pressure, the controller selectably controlling the adjusting arrangement until the pressure sensed by the pressure sensor is between a first predetermined range at least equal to the first predetermined pressure.

2. The unit of claim 1, wherein the resilient device is a spring.

3. The unit of claim 1, wherein the adjusting arrangement is a fluid ram in fluid communication with a fluid system that operates at an adjustable pressure level.

4. The unit of claim 1, wherein the adjusting arrangement includes transversely oriented slots configured and disposed with mechanical fasteners permitting selective and transverse movement to be performed manually.

5. The unit of claim 3, wherein the adjustable pressure level is controlled remotely from the first and second stripper plates.

6. The unit of claim 3, wherein a mechanical device is disposed between the fluid ram and the second stripper plate.

7. The unit of claim 6, wherein the mechanical device converts movement of the fluid ram to a rotational movement that selectably and transversely moves the second stripper plate with respect to the first stripper plate to vary the width of the gap.

8. The unit of claim 1, wherein the first and second stripper plates are of substantially identical construction.

9. The unit of claim 1, wherein the controller is in communication with a lifting device associated with controlling a vertical position of the corn head row unit; and response to an operating parameter associated with a lifting device corresponding to a condition in which the corn head row unit is not in harvesting contact with a corn row, the controller selectably controls the adjusting arrangement to move the seconds stripper plate to a predetermined gap from the first stripper plate.

10. The unit of claim 9, wherein the controller is configured to maintain the predetermined gap for a predetermined time.

11. The unit of claim 9, wherein the controller is configured to discontinue maintaining the predetermined gap prior to expiration of the predetermined time in response to a sufficient increase in the pressure sensed by the pressure sensor.

12. A cornhead row unit comprising:
first and second longitudinally extending stripper plates mounted on a frame and having opposed stripping edges which define a gap between them;
the frame further comprising:
a resilient device arranged and disposed to adjustably transversely urge the first stripper plate on the frame toward the second stripper plate to vary the width of the gap;
a powered adjusting arrangement connected to the frame, wherein the powered adjusting arrangement further comprises a pressure sensor associated with a controller and the second stripper plate, wherein in response to a pressure sensed by the pressure sensor being greater than a second predetermined pressure, the controller selectably controlling the adjusting arrangement until the pressure sensed by the pressure sensor is between a second predetermined range that is less than the second predetermined pressure; and
a mechanical device connected between the powered adjusting arrangement and the second stripper plate, so that in response to selective movement of the powered adjusting arrangement with respect to the mechanical device, the mechanical device transversely moves the second stripper plate with respect to the first stripper plate to vary the width of the gap.

13. The unit of claim 12, wherein the resilient device is a spring.

14. The unit of claim 12, wherein the powered adjusting arrangement is a fluid ram in fluid communication with a fluid system that operates at an adjustable pressure level.

15. The unit of claim 14, wherein the adjustable pressure level is controlled remotely from the first and second stripper plates.

16. The unit of claim 12, wherein the mechanical device converts movement of the powered adjusting arrangement to a rotational movement that selectably and transversely moves the second stripper plate with respect to the first stripper plate to vary the width of the gap.

17. A method of harvesting corn, the method comprising:
providing first and second longitudinally extending stripper plates mounted on a frame and having opposed stripping edges which define a gap between them; the frame further comprising: a resilient device arranged and disposed to adjustably transversely urge the first stripper plate on the frame toward the second stripper plate to vary the width of the gap; and an adjusting arrangement connecting the frame and the second stripper plate to selectably and transversely move the second stripper plate with respect to the first stripper plate to vary the width of the gap, wherein the adjusting arrangement further comprises a pressure sensor associated with a controller and the second stripper plate, wherein in response to a pressure sensed by the pressure sensor being less than a first predetermined pressure, the controller selectably controlling the adjusting arrangement until the pressure sensed by the pressure sensor is between a first predetermined range at least equal to the first predetermined pressure; and
controlling the gap between the first and second stripper plates after harvesting of a corn row has been completed and prior to resumption of harvesting of an adjacent corn row.

* * * * *